(12) United States Patent
Xiao et al.

(10) Patent No.: US 12,407,542 B2
(45) Date of Patent: Sep. 2, 2025

(54) SMART DEVICE CONTROL METHOD AND APPARATUS, ELECTRONIC DEVICE, AND COMPUTER READABLE MEDIUM

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Daiyun Xiao, Zhuhai (CN); Hongzhao Liu, Zhuhai (CN); Xilin Li, Zhuhai (CN); Hongwei Xu, Zhuhai (CN); Zhaoqi Wang, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

( * ) Notice: Subject to any disclaimer, the term of this patent is extended or adjusted under 35 U.S.C. 154(b) by 131 days.

(21) Appl. No.: 18/260,003

(22) PCT Filed: Oct. 21, 2021

(86) PCT No.: PCT/CN2021/125314
§ 371 (c)(1),
(2) Date: Jun. 29, 2023

(87) PCT Pub. No.: WO2022/142623
PCT Pub. Date: Jul. 7, 2022

(65) Prior Publication Data
US 2024/0422023 A1  Dec. 19, 2024

(30) Foreign Application Priority Data
Jan. 4, 2021 (CN) .......................... 202110003727.5

(51) Int. Cl.
*H04L 12/28* (2006.01)
*H04L 67/125* (2022.01)

(52) U.S. Cl.
CPC .......... *H04L 12/282* (2013.01); *H04L 67/125* (2013.01)

(58) Field of Classification Search
None
See application file for complete search history.

(56) References Cited

U.S. PATENT DOCUMENTS 10,186,098 B2  1/2019  Lingan et al.
10,797,895 B2  10/2020 Moorefiled, Jr. et al.
(Continued)

FOREIGN PATENT DOCUMENTS

CN  102968890 A  3/2013
CN  103906178 A  7/2014
(Continued)

OTHER PUBLICATIONS

Decision of Rejection mailed May 6, 2022, in corresponding Chinese application No. 202110003727.5, filed Jan. 4, 2021, 12 pages.
(Continued)

*Primary Examiner* — Angela Nguyen
(74) *Attorney, Agent, or Firm* — Christensen O'Connor Johnson Kindness PLLC

(57) ABSTRACT

The present disclosure provides a smart device control method, a smart device control apparatus, an electronic device, and a non-transitory computer readable medium. The method includes: determining a target relay node connected to a current terminal after the current terminal enters a target group network; identifying a scene label carried by the target relay node, the scene label being a label of a target area where the target relay node is located, each area including one relay node and at least one proxy node, and each node corresponding to one smart device; and sending a control instruction to the target relay node in a case that it
(Continued)

is determined that scene label is labeled correctly, and transmitting, by the target relay node, the control instruction to the proxy node in the target area.

13 Claims, 3 Drawing Sheets

(56) References Cited

U.S. PATENT DOCUMENTS

| | | | |
|---|---|---|---|
| 2017/0150337 A1* | 5/2017 | Bareket | H04L 67/104 |
| 2018/0359106 A1 | 12/2018 | Moorefiled, Jr. et al. | |
| 2020/0257274 A1 | 8/2020 | Zhu et al. | |
| 2021/0385642 A1* | 12/2021 | Di Girolamo | H04W 8/18 |
| 2023/0334536 A1* | 10/2023 | Brooks | H04W 4/021 |

FOREIGN PATENT DOCUMENTS

| | | |
|---|---|---|
| CN | 105353738 A | 2/2016 |
| CN | 106463047 A | 2/2017 |
| CN | 107171914 A | 9/2017 |
| CN | 108173966 A | 6/2018 |
| CN | 109194552 A | 1/2019 |
| CN | 109240111 A | 1/2019 |
| CN | 110176234 A | 8/2019 |
| CN | 110798815 A | 2/2020 |
| CN | 110824953 A | 2/2020 |
| CN | 110913382 A | 3/2020 |
| CN | 111133799 A | 5/2020 |
| CN | 111240222 A | 6/2020 |
| CN | 111857644 A | 10/2020 |
| CN | 112804319 A | 5/2021 |
| WO | 2018/133311 A1 | 6/2017 |

OTHER PUBLICATIONS

Office Action mailed Oct. 11, 2021, in corresponding Chinese application No. 202110003727.5, filed Jan. 4, 2021, 21 pages.
Office Action mailed Jan. 14, 2022, in corresponding Chinese application No. 202110003727.5, filed Jan. 4, 2021, 12 pages.
Notice of Grant mailed Jan. 5, 2023, in corresponding Chinese application No. 202110003727.5, filed Jan. 4, 2021, 8 pages.
International Search Report and Written Opinion mailed Jan. 19, 2022, issued in corresponding International Application No. PCT/CN2021/125314, filed Oct. 21, 2021, 12 pages.
Qian, Z., et al., "The Key Technology and Development of Intelligent and Connected Transportation System," Journal of Electronics & Information Technology, vol. 42, No. 1, Jan. 2020, 18 pages.
Extended European Search Report mailed May 27, 2024, issued in corresponding European Application No. EP 21913368, filed Oct. 21, 2021, 8 pages.

* cited by examiner

SMART DEVICE CONTROL METHOD AND APPARATUS, ELECTRONIC DEVICE, AND COMPUTER READABLE MEDIUM

CROSS-REFERENCE TO RELATED APPLICATIONS

This application is a National Stage 371 of International Patent Application No. PCT/CN2021/125314, filed on Oct. 21, 2021, which claims priority of Chinese patent application No. 202110003727.5, filed on Jan. 4, 2021, the entire contents of which are incorporated herein by reference.

TECHNICAL FIELD

The present disclosure relates to the technical field of smart devices, and in particular, to a smart device control method, and a smart device control apparatus, an electronic device and a computer readable medium.

BACKGROUND

With the rapid development of smart homes, smart devices gradually enter homes of ordinary people. How to build efficient and intelligent smart home systems to improve comfort, convenience, and security of user experience is the main research direction of the smart homes.

Currently, a user's home is usually equipped with multiple smart devices, and the user may control all smart devices through one application software. However, too many smart devices may cause an issue of control error due to a confusion control of the user. Especially in a case that same smart devices are arranged in different areas, the user may choose a smart device in a non-target area and control it, thus resulting in an error in the control of the smart device.

SUMMARY

The purpose of embodiments of the present disclosure is to provide a smart device control method and apparatus, an electronic device and a computer readable medium to solve an issue of an error in a control of the smart device. The specific technical solutions are as follows.

In a first aspect, a smart device control method is provided. The method includes following steps.

A target relay node connected to a current terminal is determined after the current terminal enters a target group network.

A scene label carried by the target relay node is identified. The scene label is a label of a target area where the target relay node is located. Each area includes one relay node and at least one proxy node, and each node corresponds to one smart device.

A control instruction is sent to the target relay node in a case that it is determined that the scene label is labeled correctly, and the target relay node transmits the control instruction to a proxy node in the target area.

In an embodiment, the determining the target relay node connected to the current terminal includes following steps.

A candidate signal strength between the current terminal and each of candidate relay nodes are determined, where, each of the candidate relay nodes is in a different area.

A target signal strength with the largest value is selected from all candidate signal strengths, and a relay node corresponding to the target signal strength is used as the target relay node.

In an embodiment, before the current terminal enters the target group network, the method further includes following steps.

A candidate signal strength sent by each of the candidate relay nodes and a second signal strength sent by a first device are acquired.

A first signal strength is found from a plurality of candidate signal strengths, and a difference between the second signal strength and the first signal strength is within a preset difference range.

A first relay node corresponding to the first signal strength is determined, and a scene label of the first device is set to be the same as a scene label of the first relay node.

The first device is used as a first proxy node corresponding to the first relay node, and the first relay node corresponds to at least one first proxy node.

In an embodiment, before the setting the scene label of the first device to be the same as the scene label of the first relay node, the method further includes following steps.

A first node identification of the first device is generated.

If the first node identification exists in existing node identifications, a node identification for the first proxy node is regenerated, and each node has a corresponding node identification.

If the first node identification does not exist in the existing node identifications, the first node identification is saved.

In an embodiment, before the acquiring the candidate signal strength sent by each candidate relay node, the method further includes following steps.

A device from a plurality of first devices is selected as a candidate relay node, and the plurality of first devices are located in the same location area.

The candidate relay node is labelled with the scene label according to a received labeling instruction.

In an embodiment, after the saving the first node identification, the method further includes following steps.

An information number of node information received by the first relay node is determined during a target duration, and the node information is sent by the first proxy node.

If it is determined that the information number is less than a number threshold, a second proxy node that has not sent a proxy request is determined.

A node identification of the second proxy node is deleted.

In a second aspect, a smart device control apparatus is provided. The apparatus includes following modules.

A first determination module is configured to determine a target relay node connected to a current terminal after the current terminal enters a target group network.

An identification module is configured to identify a scene label carried by the target relay node. The scene label is a label of a target area where the target relay node is located, each area includes one relay node and at least one proxy node, and each node corresponds to one smart device.

A sending module 303 is configured to send a control instruction to the target relay node in a case that it is determined that scene label is labeled correctly, and the target relay node transmits the control instruction to the proxy node in the target area.

In an embodiment, the determination module includes following units.

A determination unit is configured to determine a candidate signal strength between the current terminal and each of candidate relay nodes, and each of the candidate relay nodes is in a different area.

A selection unit is configured to select a target signal strength with the largest value from the candidate signal strengths, and use a relay node corresponding to the target signal strength as the target relay node.

In a third aspect, an electronic device is provided and includes a processor, a communication interface, a memory, and a communication bus. The processor, and the memory communicate with each other through the communication interface and the communication bus.

The memory is configured to store computer programs.

The processor is configured to perform steps of any method described above when executing the computer programs stored on the memory.

In a fourth aspect, a non-transitory computer-readable storage medium, having computer programs stored thereon, is provided. The computer programs, when executed by a processor, implement steps of any method described above.

The beneficial effects of embodiments in the present disclosure are as follows.

The smart device control method provided by the embodiments of the present disclosure includes following steps. A target relay node connected to a current terminal is determined after the current terminal enters a target group network. A scene label carried by the target relay node is identified. The scene label is a label of a target area where the target relay node is located. Each area includes one relay node and at least one proxy node, and each node corresponds to one smart device. A control instruction is sent to the target relay node in a case that it is determined that the scene label is labeled correctly, and the target relay node transmits the control instruction to a proxy node in the target area. In the embodiments of the present disclosure, the smart terminal may only identify the target relay node, then sends the control instruction to the corresponding proxy node through the target relay node, without requiring the user to select a smart terminal to be controlled from a plurality of terminals, thus avoiding the occurrence of the error of the controlled objects.

Obviously, it is not necessary for any one of the products or methods of the present disclosure to achieve all of the above advantages at the same time.

BRIEF DESCRIPTION OF THE DRAWINGS

In order to describe the technical solutions in the embodiments of the present disclosure more clearly, the accompanying drawings required for describing the embodiments or for describing the prior art will be briefly introduced as follows. Apparently, for those of ordinary skill in the art, other drawings can also be obtained according to these accompanying drawings without making any creative efforts.

DETAILED DESCRIPTION OF THE EMBODIMENTS

In order to make the purpose, technical solutions and advantages of embodiments of the present disclosure clearer, the technical solutions in the embodiments of the present disclosure will be described clearly and completely below with reference to the accompanying drawings in the embodiments of the present disclosure. Obviously, the described embodiments are part of but not all of the embodiments of the present disclosure. Based on the embodiments in the present disclosure, all other embodiments obtained without any creative efforts by a person of ordinary skill in the art fall within the scope of protection of the present disclosure.

In the following description, suffixes such as "module", "component" or "unit" are used to denote components only for the purpose of facilitating the description of the present disclosure and have no specific meaning of their own. Thus, the terms "module" and "component" may be used interchangeably.

In order to solve the issues mentioned in the background technology, according to one aspect of an embodiment of the present disclosure, a smart device control method is provided.

Figure 1:
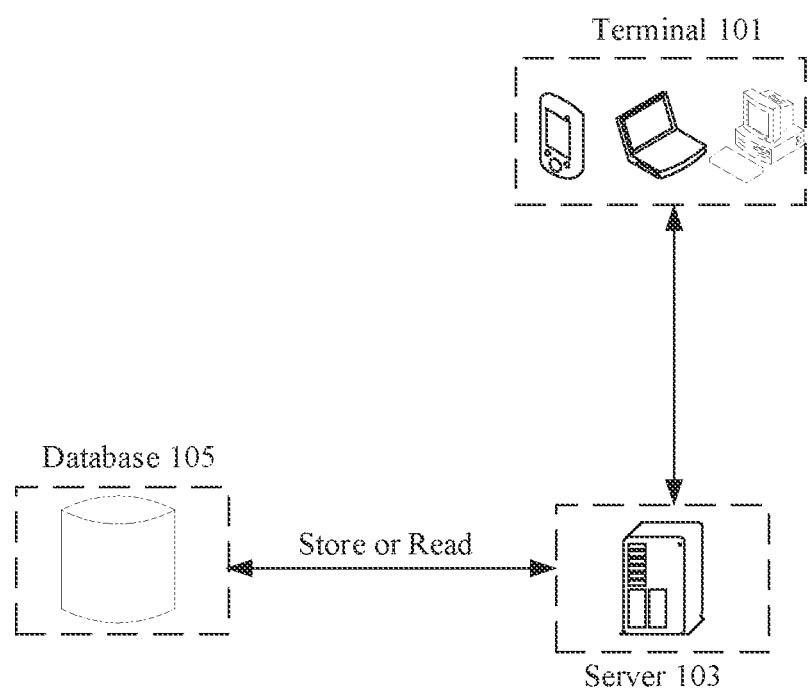
FIG. 1 is a schematic diagram illustrating a hardware environment of a smart device control method provided by an embodiment of the present disclosure.

In an embodiment of the present disclosure, the smart device control method may be applied in a hardware environment comprising a terminal 101 and a server 103 as shown in FIG. 1. As shown in FIG. 1, the server 103 is connected to the terminal 101 via a network and may be used to provide services for the terminal or for a client installed on the terminal. A database 105 may be set on or independent of the server for providing data storage services for the server 103. The network includes but is not limited to a wide area network, a metropolitan area network or a local area network, and the terminal 101 includes but is not limited to a personal computer (PC), a cell phone, a tablet computer, and so on.

The smart device control method in the embodiment of the present disclosure may be performed by the server 103, and may also be performed by the server 103 together with the terminal 101.

The smart device control method provided by the embodiment of the present disclosure may be applied to an application software in the terminal to control a smart device.

Figure 2:
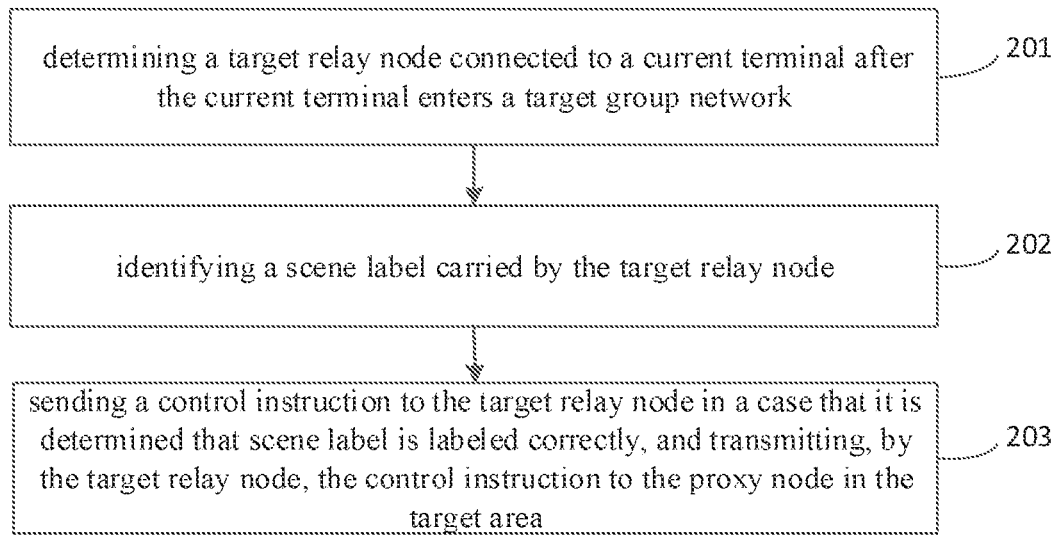
FIG. 2 is a flow chart illustrating a mart device control method provided by an embodiment of the present disclosure.

The smart device control method provided by the embodiment of the present disclosure will be described in detail below in conjunction with a specific implementation, and as shown in FIG. 2, the specific steps of the method are as follows.

In step 201, a target relay node connected to a current terminal is determined after the current terminal enters a target group network.

In the embodiment of the present disclosure, each smart device corresponds to a node, and a plurality of nodes constitute the target group network. Specifically, the target group network is a bluetooth low energy (BLE) mesh group network. A target terminal is equipped with an application software that may control all smart devices. After the target terminal enters the target group network, the target terminal identifies a smart terminal that is closest to the target terminal, and the smart terminal is the target relay node, and the application software determines the target relay node.

In step 202, a scene label carried by the target relay node is identified.

The scene label is a label of a target area where the target relay node is located. Each area includes one relay node and at least one proxy node, and each node corresponds to one smart device.

Smart devices in the group network are located in at least one area, and each area includes at least two smart devices. A smart device in an area is a relay node, and the other smart devices in the area are proxy nodes. The relay node may transmit a control instruction of the application software to a proxy node, and the proxy node performs a corresponding operation according to the control instruction. Each relay node is pre-configured with a scene label of the area where the relay node is located, and the application software may identify the scene label carried by the target relay node after determining the target relay node.

Exemplarily, a house is divided into a living room and a bedroom. The living room includes a relay node such as a TV, and proxy nodes such as a light and a floor sweeper, The bedroom includes a relay node such as an air conditioner, and a proxy node such as a light. The application software determines that the target relay node is the TV, and then identifies the living room as the scene label of the TV.

In step 203, a control instruction is sent to the target relay node in a case that it is determined that the scene label is labeled correctly, and the target relay node transmits the control instruction to a proxy node in the target area.

The scene label corresponding to each relay node is pre-configured in the database. The application software compares the identified scene label of the target relay node with a label of a corresponding relay node in the database. If they are different according to a comparison result, a comparison failure is displayed to prompt a user to update the scene label of the target relay node. If they are the same according to a comparison result, it indicates that the scene label is labeled correctly, then the application software sends the control instruction to the target relay node based on the control instruction of the user. Then the target relay node transmits the control instruction to the proxy node located in the same target area, and the corresponding proxy node executes a corresponding action according to the control instruction.

The control instruction may carry a type of the corresponding smart device. The target relay node transmits the control instruction to all proxy nodes located in the same target area, and the proxy node of the corresponding type executes the control instruction. Or the target relay node transmits the control instruction to the proxy node of the type according to the type of device carried by the control instruction, and the proxy node executes the control instruction.

Exemplarily, the target relay node is the TV, and the control instruction is to turn on the light. The application software sends an instruction of turning a light on to the TV, and the TV transmits the instruction of turning a light on to the light, then the turning the light on may be executed.

In an embodiment of the present disclosure, the smart terminal may only identify the target relay node, then sends the control instruction to the corresponding proxy node through the target relay node, without requiring the user to select a smart terminal to be controlled from a plurality of terminals, thus avoiding an occurrence of the error of controlled objects.

In an embodiment, the determining the target relay node connected to the current terminal includes following steps. A candidate signal strength between the current terminal and each of candidate relay nodes are determined, where, each of the candidate relay nodes is in a different area. A target signal strength with the largest value is selected from all candidate signal strengths, and a relay node corresponding to the target signal strength is used as the target relay node.

After the target terminal enters the group network, the relay nodes continuously send bluetooth hotspots, as the group network includes at least one relay node, and each of the relay nodes is located in a different area. After the target terminal enters one of the areas, the target terminal may receive the bluetooth hotspots sent by each candidate relay node and determine the candidate signal strength of each bluetooth hotspot. Since there are blocks such as walls between the areas, after the target terminal is located in an area, the signal strength of the relay node in the area received by the target terminal is the strongest. The target terminal selects the target signal strength with the largest value from all candidate signal strengths, and the relay node corresponding to the target signal strength is the target relay node nearest to the target terminal, namely the relay node in the area where the target terminal is currently located.

Exemplarily, when the target terminal is located in the living room, the signal strength of the TV in the living room received by the target terminal is the strongest, and the signal strength of the air conditioner in the bedroom received by the target terminal is relatively weak, then the target terminal uses the TV as the target relay node.

In an embodiment, before the current terminal enters the target group network, the method further includes following steps. A candidate signal strength sent by each of the candidate relay nodes and a second signal strength sent by a first device are acquired. A first signal strength is found from a plurality of candidate signal strengths, and a difference between the second signal strength and the first signal strength is within a preset difference range. A first relay node corresponding to the first signal strength is determined, and a scene label of the first device is set to be the same as a scene label of the first relay node. The first device is used as a first proxy node corresponding to the first relay node, and the first relay node corresponds to at least one first proxy node.

Before the target terminal enters the target group network, the target group network needs to be constructed by the relay node and the proxy node. Specifically, after the target terminal determines the relay node and labels the relay node with the scene label, the target terminal acquires the candidate signal strength sent by each candidate relay node, then acquires the second signal strength sent by the first device. The first device is one of the smart devices other than the relay node.

The target terminal acquires all candidate signal strengths sent by all of the candidate relay nodes. Since the signal strengths sent by all smart devices are the same, the difference between the first signal strength sent by the relay node in the area in which the first device is located and the second signal strength sent by the first device is within the preset difference range. When the target terminal finds the first signal strength from the plurality of candidate signal strengths, the first relay node corresponding to the first signal strength and the first device are located in the same area, and the target terminal sets the scene label of the first device to be the same as the scene label of the first relay node. Since the proxy nodes and the relay node, which are in the same area, have the same scene label, the first device is the first proxy node corresponding to the first relay node. The first relay node corresponds to at least one first proxy node.

In an embodiment, before the setting the scene label of the first device to be the same as the scene label of the first relay node, the method further includes following steps. A first node identification of the first device is generated. If the first node identification exists in existing node identifications, a node identification for the first proxy node is regenerated, and each node has a corresponding node identification. If the first node identification does not exist in the existing node identifications, the first node identification is saved.

The target terminal determines that the first device and the first relay node are located in the same area, then the first node identification of the first device is randomly generated. Each node has a corresponding node identification. In order to prevent the first node identification from being identical with any other node identification, the server determines whether the first node identification exists in the existing node identifications. If the server determines that the first node identification exists in the existing node identifications, the node identification is regenerated for the first proxy node. If the server determines that the first node identification does not exist in the existing node identifications, the first node identification is saved.

In an embodiment, before the acquiring the candidate signal strength sent by each candidate relay node, the method further includes following steps. A device from a plurality of first devices is selected as a candidate relay node, and the plurality of first devices are located in the same location area. The candidate relay node is labelled with the scene label according to a received labeling instruction.

There are a plurality of first devices in the same area. The target terminal randomly selects the device from the plurality of first devices to serve as the candidate relay node, and the user labels the candidate relay node with the scene label, and the target terminal labels the candidate relay node with the scene label according to the received labeling instruction.

In an embodiment, after the saving the first node identification, the method further includes following steps. An information number of node information received by the first relay node is determined during a target duration, and the node information is sent by the first proxy node. If it is determined that the information number is less than a number threshold, a second proxy node that has not sent a proxy request is determined. A node identification of the second proxy node is deleted.

The first relay node and the first proxy node are included in the same area. The first proxy node sends its own node information to the first relay node. Specifically, the first proxy node may send the node information once or more times during a cycle. The target terminal determines the number of the information received by the first relay node, and if the information number is determined to be less than the number threshold, it indicates that there is a first proxy node disconnected from the network. Further, the target terminal determines the second proxy node that has not sent the proxy request and deletes the node identification of the second proxy node to relieve a network pressure of the first relay node.

In an embodiment, the method further includes following steps. The smart device broadcasts proxy request information to the first relay node, and the first relay node sequentially selects a smart device with the strongest signal strength as the first proxy node.

In an embodiment, the present disclosure also provides a flow chart illustrating a processing of a smart device control method, and the specific steps are as follows.

1. Any smart device in each area is selected as the relay node, and labels the relay node with the scene label.

2. The relay node receives the proxy request information from the smart device that is in the same area and assigns the node identification to the smart device, which is named the proxy node.

3. The same scene identification as the relay node is set for the proxy node.

4. The relay nodes and agent nodes form the target group network.

5. The target terminal enters the group network, and uses the node with the received strongest signal strength as the target relay node.

6. The target terminal sends the control instruction to the target relay node.

7. The target relay node transmits the control instruction to the proxy node in the same area, and the proxy node executes the corresponding action.

Figure 3:
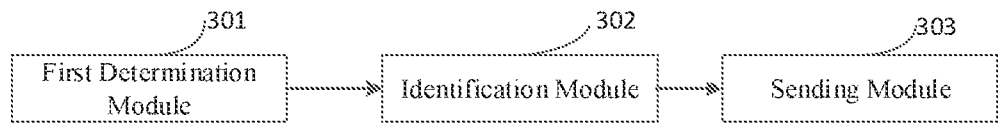
FIG. 3 is a schematic diagram illustrating a configuration of a smart device control apparatus provided by an embodiment of the present disclosure.

Based on the same technical conception, an embodiment of the present disclosure also provides a smart device control apparatus, as shown in FIG. 3. The apparatus includes following modules.

A first determination module 301 is configured to determine a target relay node connected to a current terminal after the current terminal enters a target group network.

An identification module 302 is configured to identify a scene label carried by the target relay node. The scene label is a label of a target area where the target relay node is located, each area includes one relay node and at least one proxy node, and each node corresponds to one smart device.

A sending module 303 is configured to send a control instruction to the target relay node in a case that it is determined that scene label is labeled correctly, and the target relay node transmits the control instruction to the proxy node in the target area.

In an embodiment, the first determination module 301 includes following units.

A determination unit is configured to determine a candidate signal strength between the current terminal and each of candidate relay nodes, and each of the candidate relay nodes is in a different area.

A selection unit is configured to select a target signal strength with the largest value from the candidate signal strengths, and use a relay node corresponding to the target signal strength as the target relay node.

In an embodiment, the apparatus further includes following modules.

An acquisition module is configured to acquire a candidate signal strength sent by each of the candidate relay nodes and a second signal strength sent by a first device.

A searching module is configured to find a first signal strength from a plurality of candidate signal strengths. A difference between the second signal strength and the first signal strength is within a preset difference range.

A setting module is configured to determine a first relay node corresponding to the first signal strength, and set a scene label of the first device to be the same as a scene label of the first relay node.

A configuring module is configured to use the first device as a first proxy node corresponding to the first relay node. The first relay node corresponds to at least one first proxy node.

In an embodiment, the apparatus further includes following modules.

A first generation module is configured to generate a first node identification of the first device.

A second generation module is configured to regenerate a node identification for the first proxy node if the first node identification exists in existing node identifications. Each node has a corresponding node identification.

A saving module is configured to save the first node identification if the first node identification does not exist in the existing node identifications.

In an embodiment, the apparatus further includes following modules.

A selection module is configured to select a device from a plurality of first devices as the candidate relay node. The plurality of first devices are located in the same location area.

A labeling module is configured to label the candidate relay node with the scene label according to a received labeling instruction.

In an embodiment, the apparatus further includes following modules.

A second determination module is configured to determine an information number of node information received by the first relay node during a target duration, and the node information is sent by the first proxy node.

A third determination module configured to determine a second proxy node that has not sent the node information, if it is determined that the information number is less than a quantity threshold.

A deletion module is configured to delete a node identification of the second proxy node.

Figure 4:
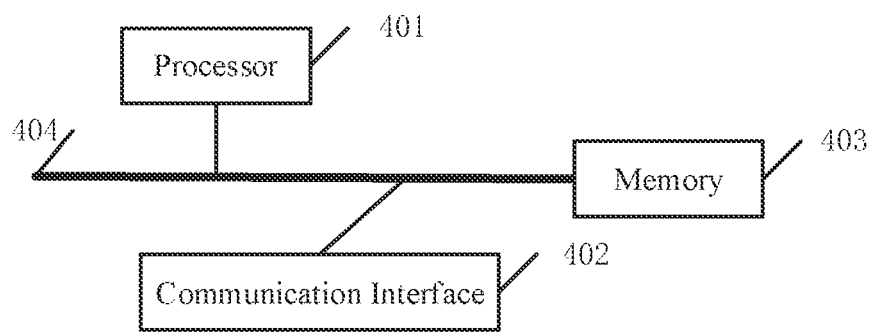
FIG. 4 is a schematic diagram illustrating a configuration of an electronic device provided by an embodiment of the present disclosure.

According to another aspect of embodiments of the present disclosure, the present disclosure provides an electronic device, as shown in FIG. 4. The electronic device includes a memory 403, a processor 401, a communication interface 402, and a communication bus 404. Computer programs that may be executed by the processor 401 is stored on the memory 403. The memory 403 and the processor 401 communicate with each other through the communication interface 402 and the communication bus 404. The processor 401 implements the steps of the above method when executing the computer programs.

The memory and the processor of the electronic device communicate with each other through the communication interface and the communication bus. The communication bus may be a peripheral component interconnect (PCI) bus or an extended industry standard architecture (EISA) bus, etc. The communication bus may be divided into an address bus, a data bus, a control bus, and so on.

The memory may include random access memory (RAM), or may include non-volatile memory, such as at least one disk memory. In an embodiment, the memory may also be at least one storage device located away from the above mentioned processor.

The above processor may be a general purpose processor, including a central processing unit (CPU), a network processor (NP), and so on. The processor may also be a digital signal processing (DSP), an application specific integrated circuit (ASIC), a field-programmable gate array (FPGA) or other programmable logic devices, discrete gate or transistor logic devices, discrete hardware components.

According to another aspect of an embodiment of the present disclosure, a non-transitory computer readable medium is provided and has program codes which may be executed by the processor.

In the embodiment of the present disclosure, the computer readable medium is configured to store the program codes which may be executed by the processor to perform the steps described above.

In an embodiment, for specific examples of the present embodiment, the examples described in the above embodiments may be referred to, and they will not be repeated in the present embodiment.

The above embodiments may be referred to during the specific implements of this embodiment of the present disclosure, and this embodiment can achieve the same technical effects as the above embodiments.

It will be understood that these embodiments described herein may be implemented by hardware, software, firmware, middleware, microcode, or a combination thereof. For implementation of hardware, the processing unit may be implemented in one or more of an application specific integrated circuit (ASIC), a digital signal processing (DSP), a digital signal processing device (DSPD), a programmable logic device (PLD), a field-programmable gate array (FPGA), a general purpose processor, a controller, a microcontroller, a microprocessor, and other electronic units for performing the functions described in the present disclosure, or a combination thereof.

For implementation of software, the techniques described herein may be implemented by means of units that perform the functions described herein. The software codes may be stored on the memory and executed by the processor. The memory may be implemented in the processor or outside the processor.

A person of ordinary skill in the art may realize that the units and algorithmic steps of each example described in conjunction with the embodiments in the present disclosure may be implemented by an electronic hardware, or a combination of a computer software and the electronic hardware. Whether these functions are performed in form of hardware or software depends on the specific application and design constraints of the technical solutions. The skilled in the art may use different methods for each particular application to achieve the described functionality, but such an implementation should not be considered outside the scope of the present disclosure.

It should be understood clearly by those skilled in the art that, for the convenience and brevity of the description, for the specific working processes of the system, device and units described above, the corresponding processes in the preceding method embodiments may be referred to, and they will not be repeated here.

In the embodiments provided in the present disclosure, it should be understood that the disclosed apparatus and method, may be implemented in other ways. For example, the above described embodiments of the apparatus are only illustrative, for example, the division of the modules is only a logical functional division, and during an actual implementation, there may be another division. For example multiple modules or components may be combined or integrated into another system, or some features may be ignored or may not be implemented. In addition, the shown or discussed mutual coupling or direct coupling or communication connection may be the indirect coupling or the communication connections through some interfaces, devices or units, and may be in an electrical, mechanical or other form.

The units illustrated as separate components may be physically separated or not, and the components displayed as units may be physical units or not. i.e., they may be located in one place, or may be distributed on a plurality of network units. Some or all of these units may be selected according to actual needs to achieve the purpose of the solution of the present embodiment.

In addition, each functional unit in each embodiment of the present disclosure may be integrated in one processing unit, or each unit may be arranged physically and separately, or two or more units may be integrated in one unit.

The functions, when implemented in form of software functional units and sold or used as separate products, may be stored in a computer readable storage medium. Based on this understanding, the technical solutions of the embodiments of the present disclosure, or the part that contributes to the prior art, or part of the technical solutions may essentially be embodied in the form of a software product.

The computer software product is stored in a storage medium and includes a number of instructions to cause a computer device (which may be a personal computer, a server, or a network device, etc.) to perform all or part of the steps of the method described in the various embodiments of the present disclosure. And the aforementioned storage medium includes: a U disk, a mobile hard disk, a read-only memory (ROM), a random access memory, a disk, a CD, or other various mediums that may store program codes. It should be noted that in the present disclosure, relationship terms such as "first" and "second" are used only to distinguish one entity or operation from another, and do not necessarily require or imply any such actual relationship or order between these entities or operations. Further, the terms "include", "comprise", or any other variation thereof are intended to cover non-exclusive inclusion such that a process, a method, an object, or an apparatus, comprising a series of elements, includes not only these elements, but also other elements that are not expressly listed or that are inherent to such process, method, object, or apparatus. Without further limitation, the element defined by the statement "including a . . . " do not exclude the existence of additional identical elements in the process, method, object or apparatus including the element.

What described above are only specific embodiments of the present disclosure which enables a person skilled in the art to understand or implement the present disclosure. Various modifications to these embodiments will be obvious to those skilled in the art, and the general principles defined in the present disclosure may be implemented in other embodiments without departing from the spirit or scope of the present disclosure. Accordingly, the present disclosure will not be limited to these embodiments illustrated in the present disclosure, but will be subject to the widest scope consistent with the principles and novel features claimed in the present disclosure.

INDUSTRIAL PRACTICALITY

The solutions provided in the embodiments of the present disclosure may be applied in the field of smart device technology, and in the embodiments of the present disclosure, the smart device control method, and the smart device control apparatus, the electronic device and the computer readable medium are used, and achieves the technical effect of avoiding the occurrence of in the error of the controlled objects.

What is claimed is:

1. A smart device control method, comprising:
   determining a target relay node connected to a current terminal after the current terminal enters a target group network;
   identifying a scene label carried by the target relay node, the scene label being a label of a target area where the target relay node is located, each area comprising one relay node and at least one proxy node, and each node corresponding to one smart device; and
   sending a control instruction to the target relay node in a case that it is determined that scene label is labeled correctly, and transmitting, by the target relay node, the control instruction to the proxy node in the target area.

2. The method of claim 1, wherein the determining the target relay node connected to the current terminal comprises:
   determining a candidate signal strength between the current terminal and each of candidate relay nodes, each of the candidate relay nodes being in a different area; and
   selecting a target signal strength with the largest value from candidate signal strengths, and using a relay node corresponding to the target signal strength as the target relay node.

3. The method of claim 2, wherein before the current terminal enters the target group network, the method further comprises:
   acquiring a candidate signal strength sent by each of the candidate relay nodes and a second signal strength sent by a first device;
   finding a first signal strength from a plurality of candidate signal strengths, a difference between the second signal strength and the first signal strength being within a preset difference range;
   determining a first relay node corresponding to the first signal strength, and setting a scene label of the first device to be the same as a scene label of the first relay node; and
   using the first device as a first proxy node corresponding to the first relay node, wherein the first relay node corresponds to at least one first proxy node.

4. The method of claim 3, wherein before the setting the scene label of the first device to be the same as the scene label of the first relay node, the method further comprises:
   generating a first node identification of the first device;
   regenerating a node identification for the first proxy node if the first node identification exists in existing node identifications, each node having a corresponding node identification; and
   saving the first node identification if the first node identification does not exist in the existing node identifications.

5. The method of claim 3, wherein before the acquiring the candidate signal strength sent by each of the candidate relay nodes, the method further comprises:
   selecting a device from a plurality of first devices as the candidate relay node, the plurality of first devices being located in the same location area; and
   labelling the candidate relay node with the scene label according to a received labeling instruction.

6. The method of claim 4, wherein after the saving the first node identification, the method further comprises:
   determining an information number of node information received by the first relay node during a target duration, and the node information being sent by the first proxy node;
   determining a second proxy node that has not sent the node information if it is determined that the information number is less than a number threshold; and
   deleting a node identification of the second proxy node.

7. A smart device control apparatus, comprising:
   a determination module, configured to determine a target relay node connected to a current terminal after the current terminal enters a target group network;
   an identification module, configured to identify a scene label carried by the target relay node, wherein the scene label is a label of a target area where the target relay node is located, each area comprises one relay node and at least one proxy node, and each node corresponds to one smart device; and
   a sending module, configured to send a control instruction to the target relay node in a case that it is determined that scene label is labeled correctly, and transmit, by the target relay node, the control instruction to the proxy node in the target area.

8. The apparatus of claim 7, wherein the determination module comprises:

a determination unit, configured to determine a candidate signal strength between the current terminal and each of candidate relay nodes, wherein each of the candidate relay nodes is in a different area; and a selection unit, configured to select a target signal strength with the largest value from candidate signal strengths, and use a relay node corresponding to the target signal strength as the target relay node.

9. An electronic device, comprising a processor, a communication interface, a memory, and a communication bus, wherein:

the processor and the memory communicate with each other through the communication interface and the communication bus;

the memory is configured to store computer programs; and the processor is configured to, when executing the computer programs stored on the memory, perform steps of the method of claim 1.

10. A non-transitory computer-readable storage medium, having computer programs stored thereon, wherein the computer programs, when executed by a processor, perform steps of the method of claim 1.

11. The method of claim 1, wherein after the identifying the scene label carried by the target relay node, the method further comprising:

comparing the identified scene label of the target relay node with a label of a corresponding relay node in a database;

displaying a comparison failure is to prompt a user to update the scene label of the target relay node, if the identified scene label of the target relay node and the label of the corresponding relay node in the database are different according to a comparison result; and the scene label being labeled correctly, if the identified scene label of the target relay node and the label of the corresponding relay node in the database are the same according to a comparison result.

12. The method of claim 1, wherein the control instruction carries a type of a corresponding smart device; and the transmitting, by the target relay node, the control instruction to the proxy node in the target area comprises: the target relay node transmitting the control instruction to all proxy nodes located in the same target area; and a proxy node of the type executing the control instruction.

13. The method of claim 1, wherein the control instruction carries a type of a corresponding smart device; and the transmitting, by the target relay node, the control instruction to the proxy node in the target area comprises: the target relay node transmitting the control instruction to a proxy node of the type according to the type of corresponding smart device carried by the control instruction.

* * * * *